United States Patent [19]

Keith

[11] Patent Number: 4,756,242

[45] Date of Patent: Jul. 12, 1988

[54] VEHICLE WINDOW VENTILATOR

[76] Inventor: William C. Keith, 305 E. 13th St., Lexington, Nebr. 68850

[21] Appl. No.: 133,136

[22] Filed: Dec. 14, 1987

[51] Int. Cl.⁴ .............................................. B60H 1/26
[52] U.S. Cl. .................... 98/2.13; 296/152; 296/154
[58] Field of Search ............. 98/2.12, 2.13; 296/93, 296/152, 154

[56] References Cited

U.S. PATENT DOCUMENTS

| | | | |
|---|---|---|---|
| 1,692,543 | 11/1928 | Bourgon | 98/2.13 |
| 1,943,573 | 1/1934 | Wingert | 98/2.13 |
| 2,040,306 | 5/1936 | Hamm | 98/2.13 |
| 2,557,442 | 6/1951 | Kurilo | 98/2.13 |
| 2,749,830 | 6/1956 | George | 98/2.13 |
| 2,859,680 | 11/1958 | O'Shei | 98/2.13 |
| 2,919,638 | 1/1960 | Mathews | 98/2.13 |
| 3,083,630 | 4/1963 | Thaxton | 98/2.12 |
| 3,866,524 | 2/1975 | Forbes | 98/2.13 |

FOREIGN PATENT DOCUMENTS 2227047  7/1973  Fed. Rep. of Germany ....... 98/2.12

Primary Examiner—Harold Joyce
Attorney, Agent, or Firm—Zarley McKee, Thomte, Voorhees & Sease

[57] ABSTRACT

The vehicle window ventilator is of a one-piece construction, including a top bulbous portion and a bottom polyurethane portion having openings extending therethrough angled from the interior of the vehicle rearwardly to the exterior for inducing quiet air flow out of the passenger compartment. Pressure of the upper edge of the window against the bottom portion of the ventilator controls the opening and closing of the polyurethane openings. The bulbous upper portion is suitable for being mounted in the inverted window channel of any vehicle window without the use of screws or hardware.

10 Claims, 2 Drawing Sheets

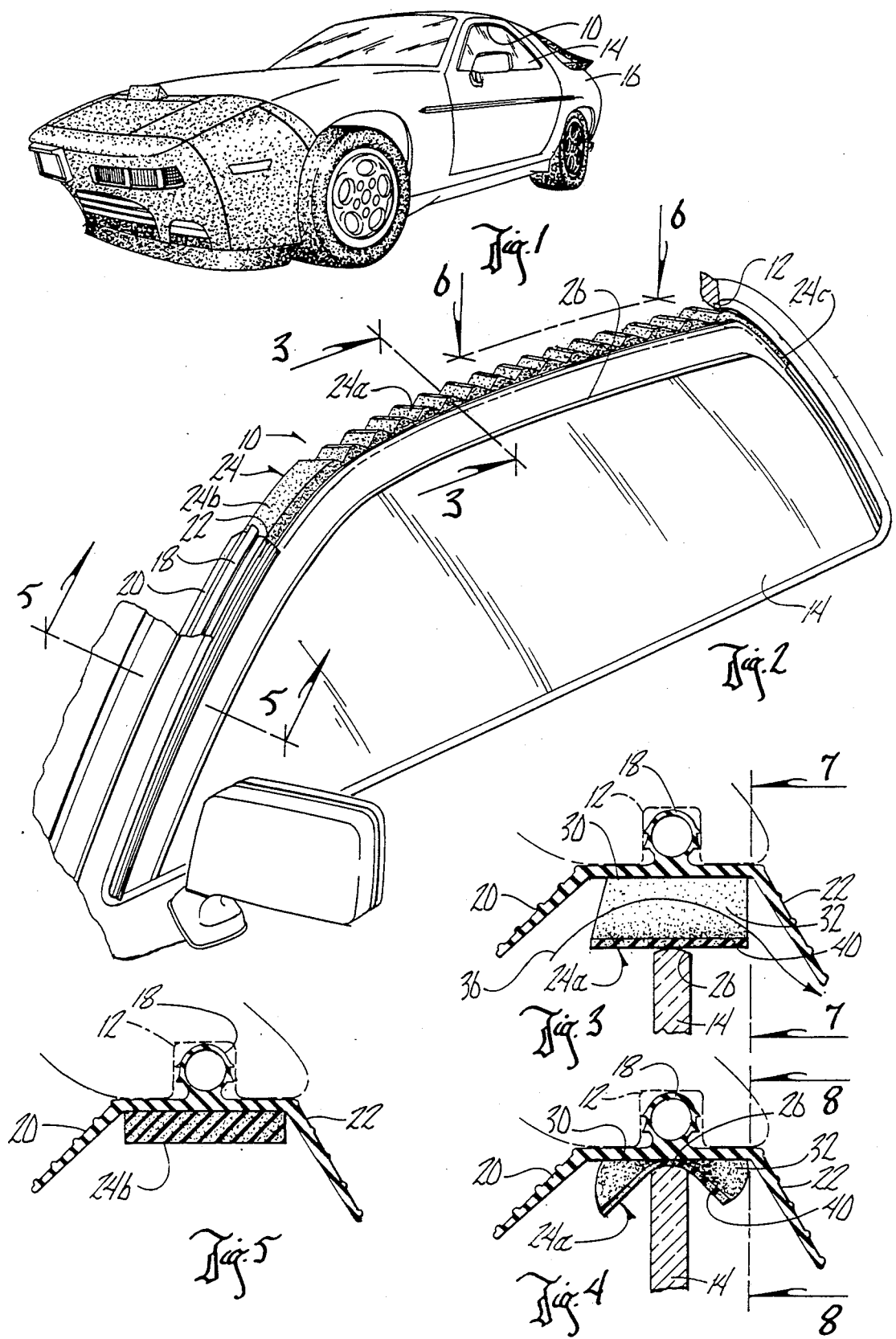

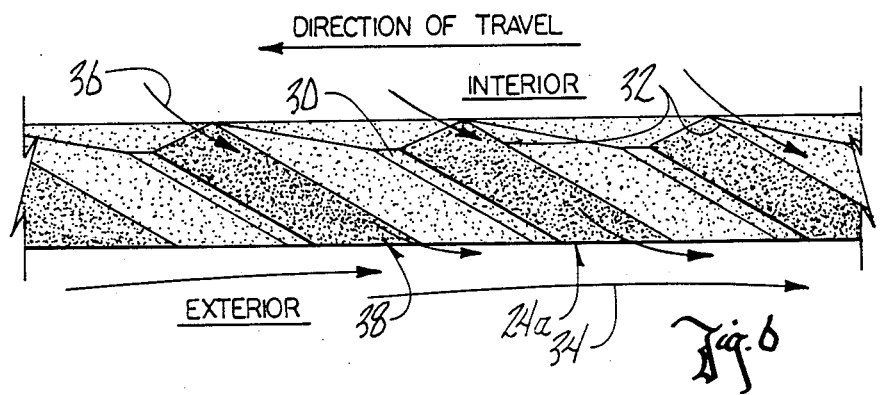
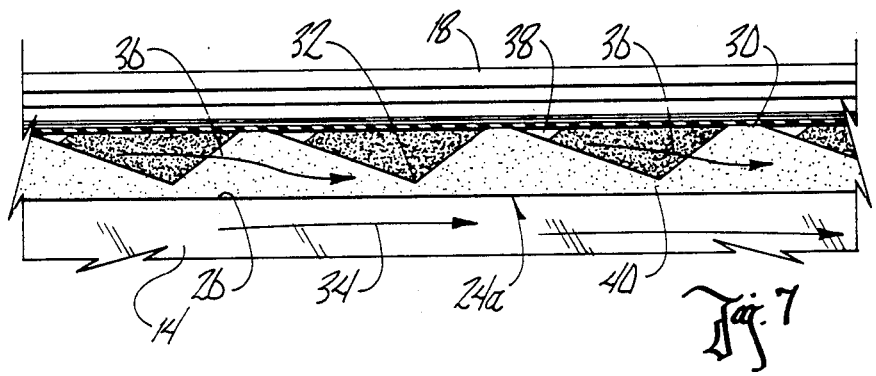
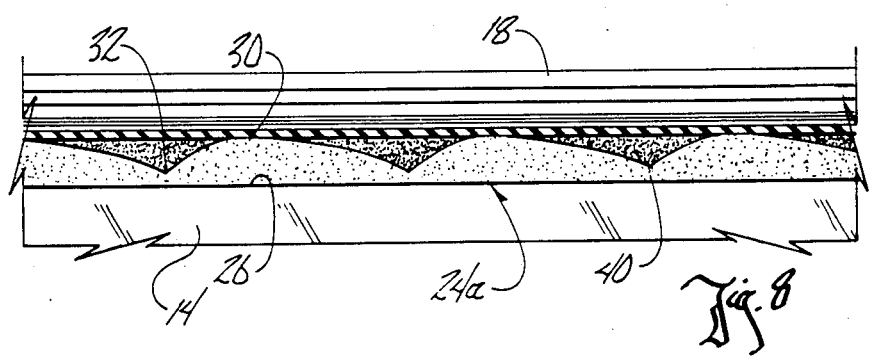

VEHICLE WINDOW VENTILATOR

BACKGROUND OF THE INVENTION

It is desirable to introduce fresh, outside air into a vehicle and exhaust the stale, inside air. This is particularly true if smoking occurs in the vehicle. The ventilator used for accomplishing this must be inexpensive and simple in construction, and allow for precise control over the flow of air. It is desirable that the ventilator be capable of use in all weather conditions without subjecting the occupants of the vehicle to wind noise or adverse exterior weather such as rain. It should not be a requirement that the vehicle be altered by the use of screws or other mechanical fasteners.

SUMMARY OF THE INVENTION

The ventilator of this invention is a one-piece construction and is opened and closed through the operation of the vehicle window. V-shaped openings are provided in polyurethane material and are closed when the polyurethane material is compressed by the raising of the window. When the window is partially opened, the natural tendency of the material to expand allows the openings to reappear, permitting air to flow therethrough. The openings are angled rearwardly, thereby minimizing exterior air turbulence and wind noise. The polyurethane material has a sound deadening quality which also quiets the air circulation noise. The ventilator is mounted to the window frame in the window channel without the use of screws or other hardware.

DESCRIPTION OF THE DRAWING

FIG. 1 is a perspective view of an automobile utilizing the window ventilator of this invention.

FIG. 2 is an enlarged, fragmentary side elevation view of a window and the associated window ventilator.

FIG. 3 is a cross-sectional view taken along line 3—3 in FIG. 2.

FIG. 4 is a cross-sectional view similar to that of FIG. 3, but showing the window in its closed position.

FIG. 5 is a cross-sectional view taken along line 5—5 in FIG. 2.

FIG. 6 is a cross-sectional view taken along line 6—6 in FIG. 2.

FIG. 7 is a cross-sectional view taken along line 7—7 in FIG. 3.

FIG. 8 is a cross-sectional view taken along line 8—8 in FIG. 4.

DESCRIPTION OF THE PREFERRED EMBODIMENT

The vehicle window ventilator of this invention is referred to in FIG. 2 generally by the reference numeral 10, and is seen mounted in a channel 12 of a window 14 of an automobile 16.

The ventilator 10 is of a one-piece construction and includes an upper bulb portion 18 received in the inverted channel 12. Integral with the bulb 18 are downwardly and outwardly extending deflectors 20 and 22. The body member of the ventilator 10 includes a lower portion 24 engagable by the upper edge 26 of the window 14, as seen in FIGS. 3 and 4.

The lower body portion 24 has a middle body portion 24A, a forward body portion 24B, and a rearward body portion 24C, as seen in FIG. 2. The middle body portion 24A is also shown in FIG. 7-8, and includes upstanding ridges 30 and valleys 32 forming passageways through the ventilator 10 extending angularly from the interior of the vehicle rearwardly to the exterior, as seen in FIG. 6. The air flow along the exterior of the vehicle is indicated by the arrows 36.

The openings 38 through the ventilator 10 extending at an angle rearwardly from the interior to the exterior induce evacuation of air from the interior. These openings 38 are v-shaped and are partially visible in FIG. 7 but are more fully viewed in FIG. 3. In FIGS. 4 and 8, the window 14 is raised, thus collapsing the polyurethane material and closing the openings 38. When the window is partially lowered, as seen in FIGS. 3 and 7, the openings 38 reappear. The rearward angle of the openings and the closed cell polyurethane material assure quiet circulation of air in and out of the vehicle.

Rain and other adverse exterior elements are prevented from entering the vehicle and contacting the occupants by the presence of the deflector 22 on the outside and the deflector 20 on the inside, which is spaced from the openings a sufficient distance to allow air flow therethrough.

The valleys 32 include a base 40 interconnecting the ridges 30 and provide a contact surface with the top edge 26 of the window 14. The upper bulbous portion 18 is made of rubber or plastic material, while the lower body portion 24 is of polyurethane, which is easily compressed under pressure from the window and expanded due to its natural resiliency when the window is opened.

The front portion 24B and rear portion 24C of the lower body portion 24 are solid, polyurethane material and do not include any openings 38. The placement of the openings 38 along the length of the ventilator may be varied according to the window 14's construction and design.

In use, it is seen that no alterations to the window are required to install the window ventilator 10 of this invention in the inverted window channel 12, as the bulbous element 18 is easily pressed into the channel 12 and may be removed easily, if desired. The ventilator 10 will fit on all windows and is ready for use immediately upon being installed. The opening and closing of the openings 28 is totally controlled by operation of the window 14, and the openings may be varied in size, as desired. The width of the lower portion 24 is wider than the upper portion of the portion 24 where it connects to the bulbous portion 18 in order to be assured that it will be engaged by the window 14 when raised.

What is claimed is:

1. A ventilator adapted to be positioned in a horizontal, inverted channel in a vehicle window opening comprising, an elongated body member having an upper bulb portion adapted to be received in a window channel, said body member including a lower portion having openings extending laterally therethrough for passage of air from one side to the other side when said openings are open, and said lower portion of said body member being of a normally expanded material which is compressible under pressure from a window when moved to its closed position whereby said openings are adapted to be closed.

2. The structure of claim 1 wherein said openings are formed by a series of ridges and valleys.

3. The structure of claim 2 wherein said openings have longitudinal axes extending diagonally across said lower portions of said body member.

4. The structure of claim 3 wherein said openings are adapted to extend from the front to the rear of a vehicle window.

5. The structure of claim 1 wherein said upper portion of said body member includes a downwardly extending deflector extending in adjacent spaced relation to said lower portion to shield said openings from moisture exterior to a window.

6. The structure of claim 5 wherein a second deflector extends from said upper body portion in adjacent spaced relation to said lower portion, said second deflector being on the opposite side from said first deflector and adapted to extend on the interior side of a vehicle window.

7. The structure of claim 1 wherein said body member includes middle, forward and rearward body portions and said middle body portion includes said laterally extending openings, said forward and rearward body portions having a lower portion which is imperforate, and said forward and rearward body portions are adapted to be positioned in the forward and rearward portions of a vehicle window.

8. The structure of claim 1 wherein said lower portion of said body member has an upper and a lower edge with said lower edge being wider than said upper edge to provide a larger area for engagement by a window, and said upper edge being integrally connected to said upper body portion.

9. The structure of claim 1 wherein said lower portion of said body member is made of polyurethane material.

10. The structure of claim 9 wherein said upper body portion of said body member is made of a compressible material substantially more dense than said lower body portion.

* * * * *